Sept. 3, 1940.   T. MUNGEN   2,213,449
IDENTIFICATION CARD HOLDER
Filed June 16, 1939
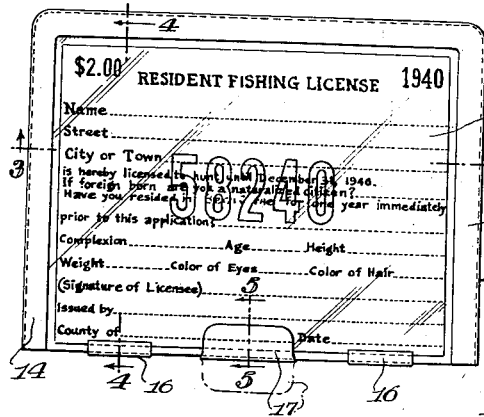
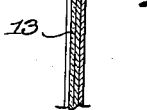
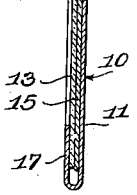
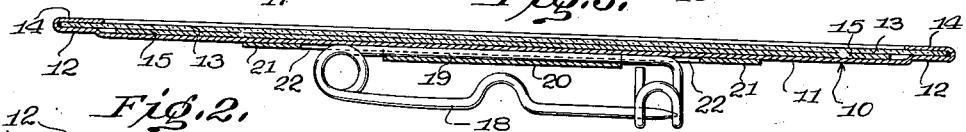
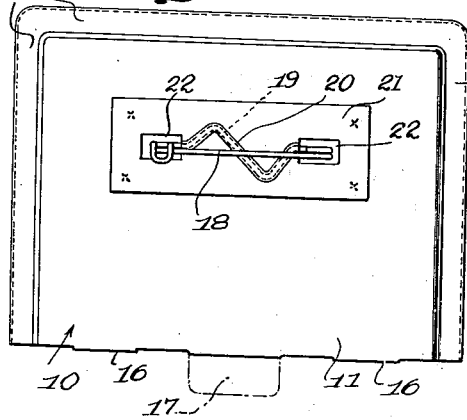
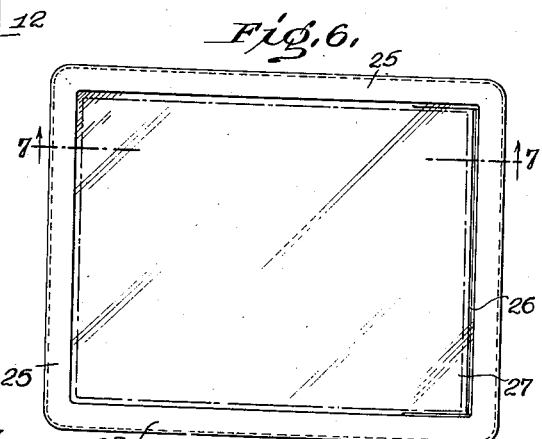
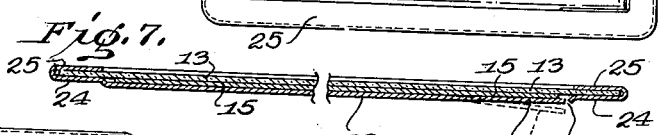
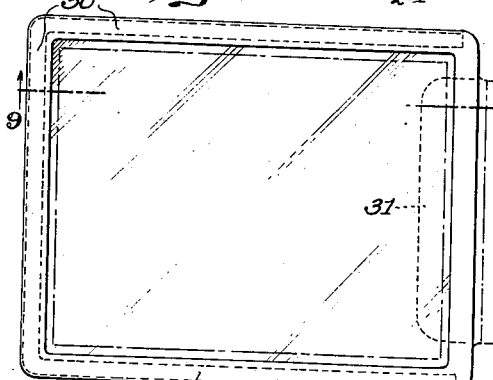
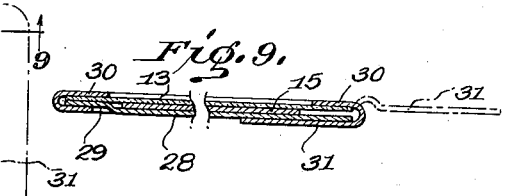
INVENTOR
Theodore Mungen
BY John P. Tarbox
ATTORNEY

Patented Sept. 3, 1940

2,213,449

UNITED STATES PATENT OFFICE 2,213,449

IDENTIFICATION CARD HOLDER

Theodore Mungen, Philadelphia, Pa., assignor to Edward G. Budd Manufacturing Company, Philadelphia, Pa., a corporation of Pennsylvania Application June 16, 1939, Serial No. 279,413

4 Claims. (Cl. 40—17)

The invention relates to a holder for an identification card, such holder being of a type to be secured to the clothing of the user. It relates more particularly to a license card holder, such as is suitable for carrying hunting or fishing licenses, etc.

Heretofore, it has in some cases been the practice to issue to the licensee an identification button or the like to be carried or worn on the person and having a serial number stamped or otherwise affixed thereto and, in addition, to issue to such person a license card carrying the name, address, and other identification data, together with a number corresponding to the number on the button. This arrangement of two separate identification means has numerous disadvantages, since the person is likely to forget one and carry only the other, and it also requires an extensive clerical force to keep track of the separate buttons and checking and re-checking to see that the number on the button corresponds to the number on the identification card.

It is an object of my invention to provide a holder for the identification card, which card carries all the data required, and to make such holder of durable construction, compact and readily carried by the wearer and to take the place, with the card secured therein, of the separate card and button. This makes it a simple matter to issue the licenses to all who may desire it at various locations in the territory for which the license is issued. It will be understood that the license carrier or holder may have other uses for identification purposes and may be used in many different relations where it is desired to have the identifying and other data always readily available on the person to whom it is issued.

To make the holder durable and to a large extent weatherproof, and at the same time easy of manufacture, its body is preferably made of thin sheet metal which can be readily formed into the desired shape and provides a smooth outer edge.

Clamped to one face of the metal body is a transparent sheet of moisture proof material, such as Celluloid, and provision is made for sliding the identification card, usually of stiff cardboard paper, between the metal body of the holder and the Celluloid sheet and to lock it in place so it will not be lost and in such position, it will be protected against rain, etc., when the same is carried exposed to the elements on the clothing of the user, suitable attaching means being associated with the holder to secure it to the clothing of the user. For convenience of manufacture and low cost, the holder may be a single piece of sheet metal of rectangular shape and suitably formed in its edges to hold the Celluloid or other transparent sheet and to provide space for inserting the card therebetween and with formations to hold it in place securely when inserted. The corners of the sheet may be suitably rounded or, if desired, a separate frame of sheet metal may be formed entirely or partly around the edge of a flat sheet, this frame holding the transparent sheet clamped in place. In such case the frame may have one edge extended in the plane of the sheet to allow the insertion of the card between it and the Celluloid sheet.

Other and further objects and advantages will become clear from the following detailed description when read in connection with the drawing forming a part hereof.

In the drawing:

Figure 1 is a front elevation of the holder with the license card secured therein.

Figure 2 is a rear elevation thereof.

Figure 3 is an enlarged transverse section therethrough taken substantially on the line 3—3 of Figure 1 and looking in the direction of the arrows at the ends of the section line.

Figure 4 is a fragmentary section on an enlarged scale taken substantially on the line 4—4 of Figure 1.

Figure 5 is a detail section taken on the line 5—5 of Figure 1 looking in the direction of the arrows at the ends of the section line.

Figure 6 is a front elevation of a modified form.

Figure 7 is a fragmentary sectional view on an enlarged scale taken on the line 7—7 of Figure 6 looking in the direction of the arrows at the ends of the section line.

Figure 8 is a front elevation of another modification and

Figure 9 is a fragmentary sectional view on an enlarged scale taken on the line 9—9 of Figure 8 looking in the direction of the arrows at the ends of the section line.

According to the preferred form shown in Figures 1 to 5 inclusive the holder 10 is shown as comprising a thin sheet metal body portion 11 of generally rectangular substantially flat form, the side and top edges of which are slightly offset at 12 to form seats upon which the edges of the transparent sheet or panel of Celluloid or the like 13 are secured. The manner in which the sheet is secured in this form consists in reverse bending the side and top edges of the offset portion 12 of the sheet metal body to form the flanges 14, these edge flanges being crimped down tight upon the Celluloid sheet to clamp it between the flanges and the offsets 12. The flanges 14 form the outer framing for the Celluloid panel.

Between the main portion of the sheet metal body and the Celluloid sheet is formed a pocket adapted to receive an identification card indicated by the numeral 15. As seen from Figures 4 and 3, this card does not extend quite up to the offset and since the bottom of the main body portion is not offset, space between the Celluloid sheet and the bottom edge of the body portion 11 is provided through which the card can be pushed upwardly into the pocket. To provide a double protection against the dropping of the card out of the holder, two reversely bent tabs 16, one of which is shown in section in Figure 4, are provided on opposite sides of the bottom of the sheet metal body portion 11. These tabs are extended up under the lower edge of the Celluloid sheet 13 and are spaced from the body 11 a distance slightly greater than the thickness of the card so that when the card is pushed up into the pocket beyond the tabs 16, its lower edge will automatically move into the space between the tabs 16 and the body 11 and be there held within the pocket.

Additional securing means is provided in the form of a wide central tab 16 at the lower edge of the body 11, this tab prior to the insertion of the card into the pocket extending down in the plane of the body as shown in dotted lines of Figure 1 and being bent upwardly to the full line position as shown in Figure 1 and in the section of Figure 5 to clamp the card securely in place.

By this arrangement of the tabs 16 and 17 the securement of the card in the pocket is doubly assured.

As shown in Figures 2 and 3, a securing means 18 shown here in a form similar to the common safety pin is rigidly secured to the back of the body 11 of the holder, the securing means being arranged slightly above the center of the holder. The securing means consists of a bent wire pin, the base 19 of which is of zigzag shape and secured in an offset 20 formed in the plate 21 which is spot welded to the back of the body portion 11, the securing portion of the pin projecting through openings 22 in the plate 21.

With this arrangement the identification card holder can be readily secured in an exposed position to the clothing of the wearer as is desirable in the case of hunting and fishing licenses. By reason of the fact that the top and side marginal flanges 14 of the holder are clamped down tight upon the Celluloid sheet, they are rendered practically water-proof and the user of the holder can encounter stormy weather without danger that the card will become water soaked or otherwise injured by the elements. The holder can be made of very convenient size, the size shown in Figure 1 being about actual size.

It will rarely be necessary to change the card in the holder but if this becomes necessary or desirable, it can readily be done by bending back the tab 17, lifting the card until its lower edge passes out of engagement with the tabs 16 and then pulling it down past the tabs 16 out of the pocket, this being the reverse of the insertion of the card into the pocket.

In the form of Figures 6 and 7 the sheet metal body of the holder is indicated by numeral 23 and in this form it is shown as having an offset flange 24 entirely around its outer margin, the Celluloid sheet 13 being clamped down by the turned-over edge flange 25 upon the seat formed by the offset 24. To provide access to the pocket between the body 23 of the holder and the Celluloid sheet 13 in this form of the invention, a slot 26 is formed adjacent the offset along a side margin of the holder. The card 15 may be slid into the holder through this slot and retained therein by pressing down the portion 27 of the body 23 adjacent the slot, so as to substantially close the slot, from the dotted line position to the full line position in Figure 7.

In the form shown in Figure 8 the sheet metal body of the holder is designated 28 and is shown provided with an offset edge flange 29 along three sides, the fourth side being left in the plane of the body. In this form the edge of the offset portion is not reversely bent, but a separate U-shaped finishing frame 30 of sheet metal is clamped down over the offset edges 29 and the edge of the Celluloid sheet 13. This frame along the plain edge of the body 28 is formed with an outwardly extending tab 31 as shown in the dot and dash lines of Figures 8 and 9. After the card 15 is inserted through this open side into the pocket, the wide tab 31, which extends almost the width of the holder, is bent down across the back of the holder as shown in full lines in Figure 9 and in dotted lines in Figure 8. This arrangement provides a very neat appearance since a separate frame can be made of any ornamental metal desired.

It is, of course, understood that the form shown in Figures 6 and 7 could be similarly provided with a separate ornamental frame instead of bending over the margins of the main body 23 to form the frame 25. Another advantage of the separate frame is that the corner portions can be more readily formed and when formed, present a more pleasing appearance since it is not necessary to slit the metal in the corners as would probably be the case where the frame forming flanges as 14 and 25 are formed integrally with the body of the sheet metal body.

The metal forming the holder may be of any suitable sheet metal which can be readily worked and which is preferably coated with a rust-proof coating or is itself an alloy which resists corrosion.

While I have herein described several forms which the invention may take, it will be understood that other modifications are possible and would readily occur to one skilled in this art and all such modifications are intended to be covered by the claims appended hereto.

What I claim is:

1. A holder of the class described comprising a generally rectangular substantially flat sheet metal body portion having a marginal offset portion extending around at least three sides thereof, a transparent panel extending across one face thereof, seated at its margin on the offset portion and providing with the body portion inwardly of said offset margin a card receiving pocket, a separate sheet metal frame for clamping said panel to the offset portion, the fourth side of the holder having a slot opening into said pocket and permitting the insertion of a card through said slot into the pocket and deformable means on one of said body portion and frame movable to close the slot.

2. A holder according to claim 1 in which said deformable means comprises an extension on one of said body portion and frame arranged to be bent around the margin of the other to close said slot.

3. A holder according to claim 1 in which said deformable means comprises an extension on the frame arranged to be bent around the margin of the body portion over the back thereof to close said slot.

4. A holder according to claim 1 in which said deformable means comprises an extension on one of said body portion and frame arranged to be bent around the margin of the other to close said slot, said extension being preformed with a bead arranged to facilitate the bending around operation, said bead when the extension is bent around constituting a rounded margin for the holder on said fourth side.

THEODORE MUNGEN.